Figure 1:
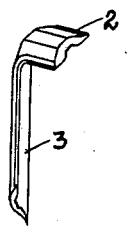

Jan. 8, 1963 J. C. LANG 3,072,008
STRIP FASTENERS AND METHOD OF MAKING SAME
Filed March 4, 1959 4 Sheets-Sheet 1

*INVENTOR.*
JOSEPH C. LANG.
BY
*Christy, Parmelee Strickland*
ATTORNEYS.

INVENTOR.
JOSEPH C. LANG.
BY
ATTORNEYS.

INVENTOR.
JOSEPH C. LANG.
BY
ATTORNEYS.

Jan. 8, 1963 J. C. LANG 3,072,008
STRIP FASTENERS AND METHOD OF MAKING SAME
Filed March 4, 1959 4 Sheets-Sheet 4

INVENTOR.
JOSEPH C. LANG.
BY
ATTORNEYS.

United States Patent Office 3,072,008
Patented Jan. 8, 1963

3,072,008
STRIP FASTENERS AND METHOD OF
MAKING SAME
Joseph C. Lang, Pittsburgh, Pa., assignor to Bocjl Corporation, Pittsburgh, Pa., a corporation of Delaware
Filed Mar. 4, 1959, Ser. No. 797,301
4 Claims. (Cl. 85—11)

This invention relates to fasteners prepared in strip form and is for a novel fastener, fastener strip and method. This application is a continuation-in-part of my application Serial No. 584,581, filed May 14, 1956, now abandoned, and a continuation-in-part of application Serial No. 377,457, filed August 31, 1953, now abandoned, which in turn is a division of Patent No. 2,651,232 granted September 8, 1953.

There has long existed need for driven fasteners such as staples and tacks made in strips of indefinite length which may be fed into a driving machine which severs each fastener from the strip and drives it. However, up to the present time, efforts along this line have not proved successful, and the usual procedure is either to form the staples and glue them together with adhesive into relatively short sticks, or to provide machines commonly referred to as stitchers, wherein wire is fed into a forming machine, a length of the wire cut off, and the piece so severed is converted into a staple in this machine, the cutting, shaping and driving being accomplished entirely in the one machine.

One difficulty has been that if a strip of rolled sheet metal is used as the stock from which a succession of blanks is formed, the legs of the blanks run crossways of the grain of the metal, they are so weak that they break or crumple very easily. A second difficulty is that the score lines are formed transversely of the strip and the work hardening that occurs in impressing score lines deep enough to be effective embrittles the strip so that it cannot be coiled and uncoiled, and it must be formed into coils to be received in a magazine capable of holding several hundred staples, and uncoiled as the strip moves out of the magazine. The first difficulty can be somewhat obviated by using cold rolled strip instead of soft carbon steel, but this aggravates the second difficulty.

In my patent above mentioned, and the divisional application, the fasteners are formed by having the leg elements extend diagonally of the strip, thus relieving the first difficulty, but the score lines are formed by slitting or breaking the metal, which is a relatively slow, though practical procedure. However, to secure the desired strength, a relatively heavy gauge strip must be used.

In some instances, as in Vogel Patent No. 2,021,274 dated November 19, 1935, it is proposed to roll score lines in sheet metal, either by passing the metal lengthwise between rolls having parallel teeth and grooves, forming ridges and grooves lengthwise of the strip and then cutting the strip into short lengths, corresponding to the length of a staple, to make a strip of fastener blanks no longer than the strip is wide. This overcomes the first defect above noted, but defeats the reason for using a strip. That is, a strip of blanks of indefinite length is not secured. The Vogel patent shows another method in which the strip passes lengthwise through the bight of the rolls on which are transverse teeth or elements, one score line being impressed in the metal each time the strip advances one increment. This does not eliminate the first difficulty above noted, and like the process of slitting or breaking disclosed in the patent and application above referred to, requires a relatively heavy gauge metal to be used. A further difficulty arises from this procedure in that the life of the die rolls is very short due to the fact that between the die surfaces of the rolls there is no load on the dies, or minimum pressure, and then as each succeeding die element engages the strip, the rolls are suddenly subjected to maximum pressure, so that if there are say twenty teeth around the periphery of the die rolls, pressure is almost instantly built up and relieved twenty times per revolution, and a very heavy pressure is required to make a score line across a strip say one inch wide. This action is very destructive to the rolls. So far as I am aware the Vogel method has never been successful, and heretofore no way of avoiding the many difficulties has been provided.

The present invention provides a novel fastener, fastener strip and method wherein the formation of the fasteners from sheet metal is accomplished and the obstacles inherent in previous attempts to accomplish a similar result are overcome. A further object of my invention is to provide an improved sheet metal fastener and fastener strip and an improved method of making the same.

According to my invention soft metal instead of cold rolled metal is used, the metal is worked in a manner to overcome the weakness resulting from the initial undesirable grain orientation in the leg elements of the staple, and the metal is worked to controllably increase its thickness in the finished product over its original thickness in certain portions of the blank and diminish the thickness in other portions, enabling thinner original stock to produce a better fastener than other procedures secure with initially thicker stock.

Figure 2:
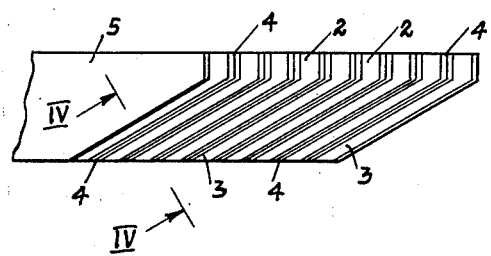
Figure 3:
Figure 4:
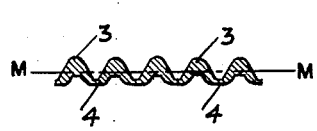
Figure 5:
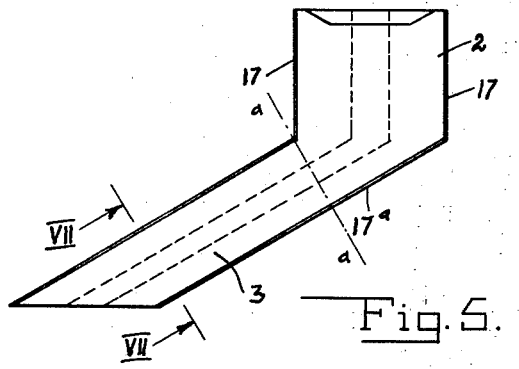
Figure 6:
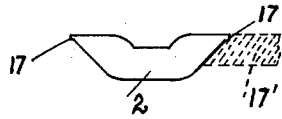
Figure 7:
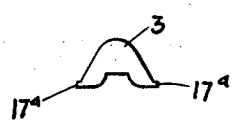
Figure 8:
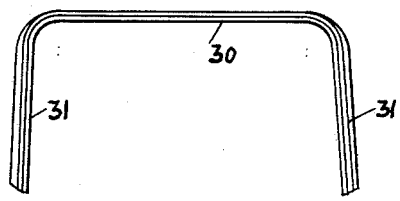
Figure 9:
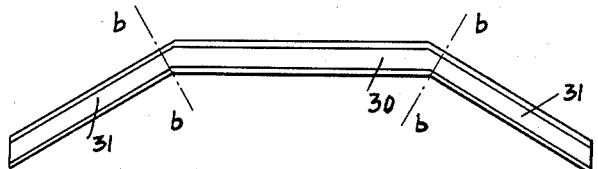
Figure 10:
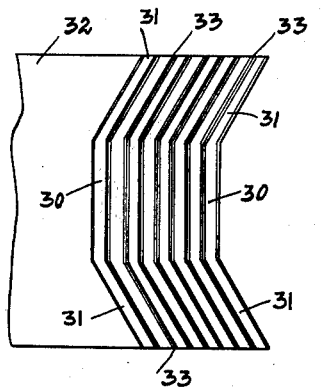
Figure 11:
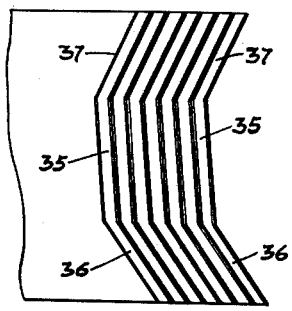
Figure 12:
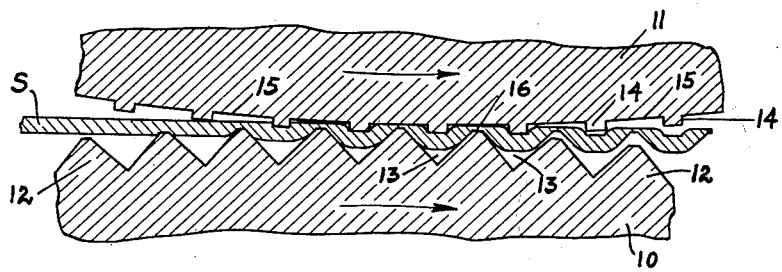
Figure 13:
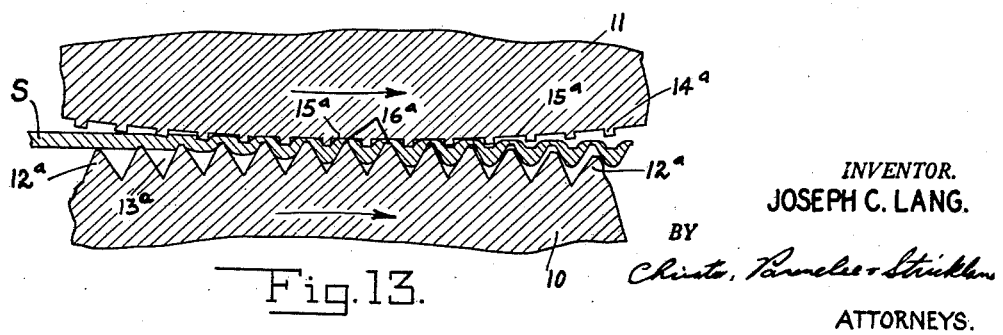
Figure 14:
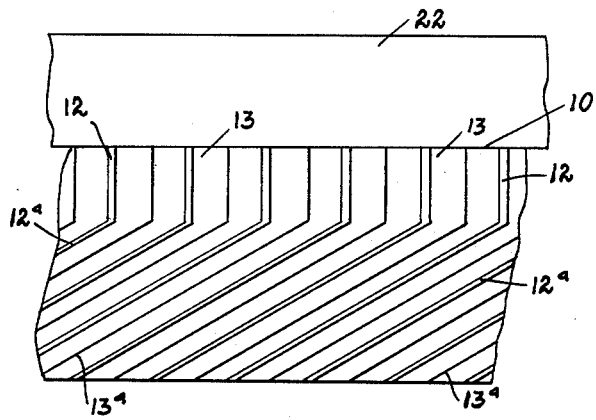
Figure 15:
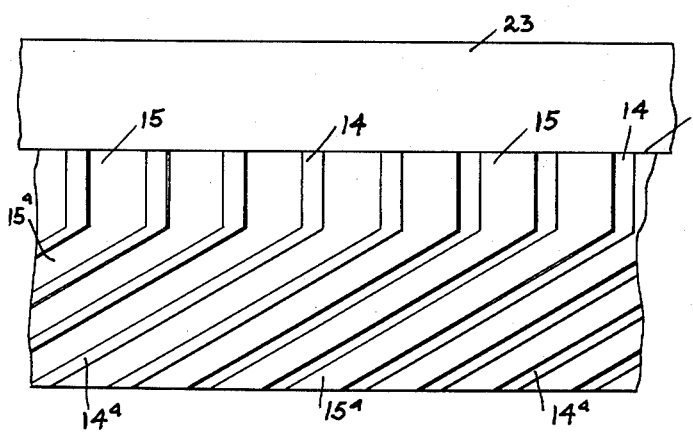
Figure 17:
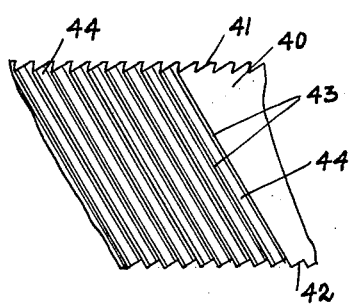
Figure 18:
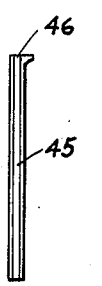
Figure 16:
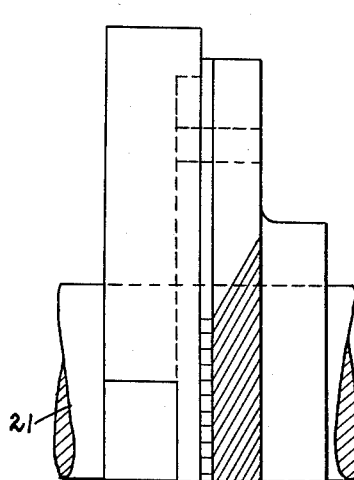
Figure 16:
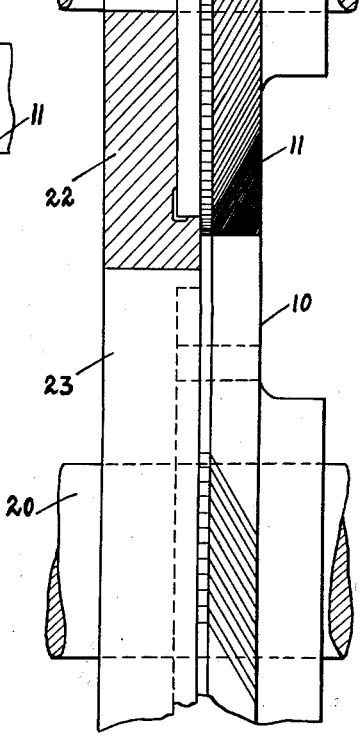
Figure 20:
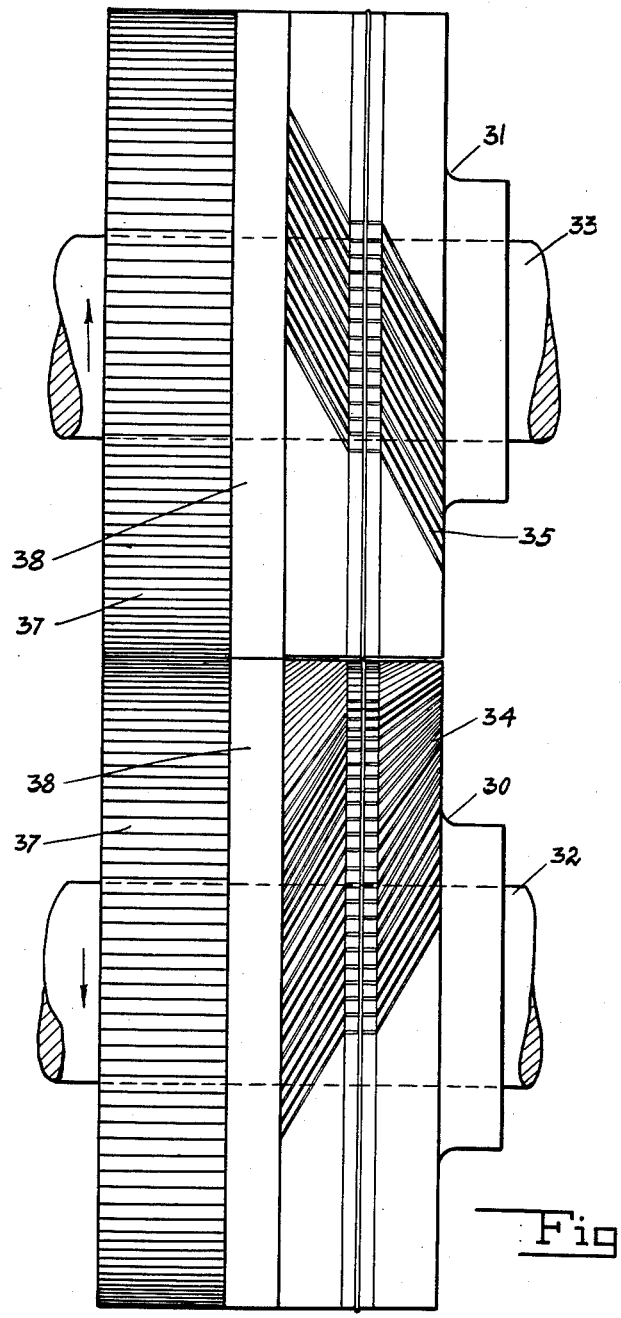
Figure 19:
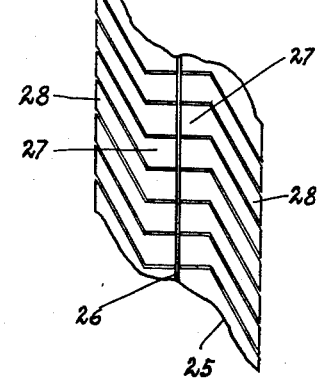

My invention may be more fully understood by reference to the accompanying drawings in which:

FIG. 1 is a perspective view of a single nail or tack;
FIG. 2 is a plan view of a connected series of blanks for forming the tack of FIG. 1;
FIG. 3 is a side elevation of the strip of FIG. 2 looking toward the head-forming edge of the strip;
FIG. 4 is a section transversely through the leg-forming elements in the plane in line IV—IV of FIG. 2, and it is turned upside down with respect to FIG. 3;
FIG. 5 is an enlarged plan view of a single blank;
FIG. 6 is an end view projected from the head end of FIG. 5;
FIG. 7 is a transverse section in the plane of line VII—VII of FIG. 5;
FIG. 8 is a front elevation of a staple embodying my invention;
FIG. 9 is a plan view of a single blank for forming the staple of FIG. 8;
FIG. 10 is a plan view on a smaller scale showing a strip with a connected series of staple blanks similar to FIG. 9 formed therein;
FIG. 11 is a modified view of the strip shown in FIG. 10;
FIG. 12 is an enlarged fragmentary view showing the shape of the forming rolls for forming the head or bridge portion of the fastener;
FIG. 13 is a view similar to FIG. 12 showing the leg-forming portions of the rolls as if in transverse section;
FIG. 14 is a fragmentary view on a much enlarged scale of a portion of one roll face for forming a nail or tack, looking down from the bight of the rolls;
FIG. 15 is a fragmentary view similar to FIG. 14 of the complementary roll face looking up from the bight of the rolls;
FIG. 16 is a somewhat schematic view showing two rolls for forming fastener strip;
FIG. 17 is a plan view showing the development of a nail type form of fastener;
FIG. 18 is a side view of a single fastener detached from a connected series;
FIG. 19 is a plan view illustrating a preferred manner of making the tack strip; and
FIG. 20 is a view similar to FIG. 16 showing a pair of rolls preferable to those shown in FIG. 16.

The present invention is applicable to the forming of tacks, staples and nails from strip sheet metal. The tack and tack strip will be first described. Fundamentally the tack is of the form shown in Patent No. 2,651,232 above mentioned, in that as shown in FIG. 1 it has a head 2 and a leg 3, the leg being at right angles to the head and being in a vertical plane which is oblique to that axis of the head which etxends across the length of the head into the upper end of the leg. This is by reason of the fact that the initial blank from which the tack is formed is of the shape shown in FIG. 5 where the leg extends obliquely from one edge of the head and is bent down to a vertical position on a bend line a—a that is transverse to the axis of the leg, but at an angle to the side edges of the head.

The fastener blanks are cut one at a time from a connected strip of such blanks as shown in FIG. 2, each blank being joined to the adjacent ones by narrow flat bands or areas, designated 4 in FIG. 2, while 2 and 3 designate the head and leg-forming elements respectively of the blanks, and for purposes of explanation a part of the original strip or ribbon of metal, designated 5 is also illustrated, but in actual practice the formation of blanks extends throughout the length of the strip and would not normally stop intermediate the ends as shown in FIG. 2.

The present invention is directed to a strip and method of producing a strip to provide superior fasteners more economically by the proper working of strip sheet metal in rolls. According to this invention the strip is fed between two rolls 10 and 11 that have complementary forming surfaces thereon, and which are rotated at relatively high speed, 10 being the lower roll, and 11 the upper one. In FIGS. 12 and 13 I have shown on an enlarged scale, vertical sections through the two rolls showing, in transverse section, the portions of the die surfaces that form the head and leg elements respectively, the views being representations transverse to the die elements on the rolls, FIG. 12 being a true transverse section, but FIG. 13 being modified to the extent indicated. In FIGS. 14 and 15 I have shown as as flat projections, on an enlarged scale, portions of the bottom roll surface and top roll surfaces, respectively.

The lower roll 10 has in its periphery transverse teeth 12 with slightly flattened top edges and V-shaped valleys 13 in between them. As shown in FIG. 14, each transvers tooth is extended obliquely as indicated at 12a, and each valley is likewise extended as at 13a, but the teeth and valleys of the extensions are narrower in section than their counterparts 12 and 13. In FIG. 14 (and also in FIG. 15) the elements appear as flat surfaces, but actually the elements 12a and 13a should be viewed as the teeth of a spiral gear, that is, the ridges 12a are diagonally, or perhaps more exactly, obliquely disposed on the surface of a cylinder. Hence while the transverse teeth 12 make line contact with the strip material, the teeth 12a make what may be termed point contact, in that as the roll turns, different points along the diagonal die elements progressively contact the strip. It may be here explained that the terms "oblique" and "diagonal" are herein used interchangeably.

The opposite roll 11 has short transverse ridges 14 thereon separated by wide shallow channels 15. The rolls 10 and 11 are geared together so that one rib 14 always centers exactly between two ridge elements 12, and each channel 15 centers over the peak of an element 12 of the lower roll. The two rolls travel at equal speeds and have an equal number of die elements. Each rib 14 has a diagonal extension 14a at the side, and each channel is extended diagonally at 15a. The ribs 14a and the channels 15a are narrower in width (when viewed transversely of the length of the ribs and channels but not circumferentially) than their respective transverse counterparts 14 and 15. The elements 14 and 15 make line contact with the strip, designated 8, while the elements 14a and 15a, like elements 12a and 13a, make what may be termed point contact.

It is to be noted that the die elements of the two rolls are not matched in the sense that the ridges and cavities are of identical shape, as for instance would be the die elements or corrugating rolls, but that the valley portions 13 and 13a are much deeper than the height of the ridge 14 and the cooperating surfaces of the ridge and valley elements of opposed rolls are not symmetrical with each other. Likewise the top edge of each rib 12 and 12a confronts a wide flat surface of the opposite roll.

It will be seen by reference to FIGS. 12 and 13 that the minimum clearance between the elements of the two rolls exists when a ridge 12 on a lower roll is centered under a "flat" on the upper roll, the same clearance existing between the ridge 12a of the lower roll and the flat 15a above it. This distance is substantially less than the thickness of the original strip S. Since the ridges 12 are flattened at their top, their action on the strip is to produce narrow, flat severance bands or strips 4 between adjacent flanks on the strip. The maximum clearance between the two roll surfaces is when a ridge 14 is opposite a groove 13 on the other roll, this distance being greater than the thickness of the original strip 7. This results in the metal of the strip being wedged from its original length down into the valleys 13. This wedging of the metal down into V-shaped valleys thickens the metal above its original thickness, and in addition metal displaced in forming the severance strips 4 flows into the valley between the ridges 12, adding further to the increase in the metal between the ridges 12. Thus the strip is alternately flattened and thinned and then thickened beyond its original thickness, the thickened part being concave-convex in section. Each diagonal groove 13a, being transversely narrower than its counterpart 13, has to have more metal forced into it than is forced into the wider groove 13 to avoid stressing the metal unequally, since the entire strip must advance at uniform speed. However, both the head-forming portion and leg-forming portion are concave on one surface and convex on the other, and the concave surfaces of the ridges are on the reverse face of the strip from the indentations 4. The die ribs 14 and 14a, while being of different widths, are of the same height, and their height is much less than the depth of the grooves 13a and 13, and at the point of maximum engagement of the ribs and grooves, the ribs barely extend below the tops of the ridges 12 and 12a, and the distance from the flat tops of the ridges 14 to the bottoms of the grooves 13 and 13a is greater than the height of these ridges above the roll surface on which they are formed.

As explained above, ridges 12 make line contact across that part of the full width of the strip that passes over them, while the diagonal ridges 12a have a rolling or point contact with the areas of the strip which they contact, so that the forming action of the leg-forming ridges is from the center toward the edges of the strip, tending to roll the metal lengthwise of the leg-forming elements. The concave-convex section imparts a columnar strength to the leg-forming elements of the blank with maximum strength being secured by making the thickness in the ridge greater than the thickness of the original strip. Also, the cold working of the metal by the point contact of the die elements progressively along the length of the leg elements tends to reorient the grain structure and work harden the original soft metal of the strip.

In FIG. 6, which is a section across the head, the numeral 17' and the dotted area indicates the thickness and plane of the original strip, and it is plainly seen that not only is the overall thickness of the strip greater than that of the original strip, but the metal thickness through the head is increased. In FIG. 7 the increase in metal thickness in the leg section is even more pronounced. The flat areas or bands 4 connecting the successive blanks provide the excess metal to be cold flowed into the legs, displacing more metal than would the rolling of narrow V-shaped indentations. Moreover, these flat areas make the severing of each blank in turn from the strip in a driving implement easier because the indexing of the strip need be less exact. A third advantage is that a lip or flange 17a is formed along the edges of the head and legs. This is of advantage on the head because it helps hold the head tight against the fabric or box board into which the tack is driven, and it increases the holding power of the legs by providing greater area than would a sharp edge.

The rolling of the legs diagonally of the strip, with the legs being substantially longer than the transverse width of the strip in which they are formed brings about a condition where the rolling of one blank begins before a preceding blank has been finished, so that there is no "chatter" of the rolls, or no change from no load to full load with the forming of each blank. Consequently wear on the die surfaces is reduced, as is also wear on the roll bearings.

Referring briefly to FIG. 16, which is generally schematic, rolls 10 and 11 are on shafts 20 and 21 respectively, in a mill housing (not shown). A disk 22 on one face of roll 11 is of larger diameter than the roll, while the roll 10 has a disk 23 of smaller diameter thereon, and the disk 22 thus overlaps one edge of die roll 10, forming a side guide for one edge of the strip being fed through the mill. The two rolls are driven in unison at equal speeds by gearing from a source of power in a conventional manner. FIG. 16, while showing for purposes of simple explanation one apparatus for forming a tack strip, has certain disadvantages, and a preferred method will be later described.

It will be seen, therefore, that the present procedure entails more than the corrugating of a strip of metal or the impression of score lines in a strip, but is a process in which displacement of the metal from the areas 4 is combined with the crowding of the metal from its original plane into the recesses 13 so as to thicken the ridges of the finished strip which form the leg elements along the center line of such ridges. The head and the leg are of concavo-convex section, but the convex and concave surfaces are not concentric. If the strip be considered as a corrugated strip, the peaks or ridges extending in one direction from the median plane are thickened beyond the thickness of the original strip, and those extending the other direction are thinner than the metal of the original strip. By reference to FIGS. 3 and 4, if the line M—M represents the medial plane of the finished strip, the ridges forming the center portions of the heads and legs at one side of said plane have substantially heavier section than the valleys or corrugations on the other side of said plane, the former being substantially solid metal, while the valleys are thin flat areas that merge through upturned thickening sides into the ridges. Of additional importance is the fact that in the leg-forming element of the strip the formation of the leg progresses from the inner end toward the outer end, the combined cold working in this way tempering or toughening soft steel so that the legs can be bent to the required vertical position without breaking and have the required columnar strength. When the strip is coiled, the areas 4 are oblique to the axis about which the strip is coiled, so that even though the metal is weak it is not flexed along the line of weakening, so that the strip does not break apart.

So far I have described only the tack or nail and its manufacture. Essentially the same improvements are embodied in the staple, which is different from the tack only in that the head portion is longer to form a bridge, and there are two leg elements on each blank, one at each end of the bridge, instead of one as with the tack or nail.

The staple in one form and staple blanks are shown in FIGS. 8 to 11 inclusive. The staple and blank are of the general oblique character described in my said application Serial No. 377,457, but modified according to the present invention. Referring first to FIG. 9, the staple blank as formed from sheet metal has a central bridge-forming portion 30 with oblique or angular extensions 31 at each end, these providing the leg-forming elements. In use the legs are bent downwardly at an angle transverse to the axis of the extensions 31, being bent on an axis such as that indicated by the dotted line b—b in FIG. 9. As thus turned down, the legs are perpendicular to the plane of the bridge, as in a conventional staple, but the legs are in vertical planes that are not parallel, or which are at different angles to the direction of the axis of the bridge. The staple so formed is shown in FIG. 8. As pointed out in my aforesaid application, a staple so constructed has superior holding power, especially in soft material such as box board. A driver for driving a staple of this shape, utilizing a connected strip of blanks to the general form described, is disclosed in my Patent No. 2,845,626, granted August 5, 1958, which apparatus by slight modification may also handle the nail or tack.

The blanks are formed as a connected series or strip of blanks from a flat ribbon of metal 32 (see FIG. 10) by rolling between rolls as heretofore described, and the bridge portions have a transverse section which is concave-convex as are the heads of the nails or tacks previously described, and the leg portions are narrower and of the same shape in section as the leg section of the tack or nail. The parting strip along the entire edge of the blank designated 33—33 is pressed into the metal in the same way so that each blank, while not completely severed, is easily separated, the metal in the strip 33—33 being thinned much thinner than the original metal with the original metal being displaced into the edges of the legs and head as described in connection with the tack. The legs are not only strengthened by this fact, and by being concave-convex in section, but by the thickening of the section that takes place in the rolling. Also, because the legs are diagonal, the rolling pressure progresses, with the progression of the point contact of the die elements, tending to orient the grain in the direction of the length of the leg as previously described.

Here also, if the strip be considered as a corrugated strip, the peaks above the medial plane or ordinate are thicker in section than the original strip and the peaks below are of thinner section than the original sheet. In this illustration I have used "above" and "below" in the relative sense in which the strip moves through the driver, whereas in the rolling as illustrated, these directions are reversed.

In some cases, especially with large size staples, it may be desirable to make the head or bridge at an angle to the transverse axis of the strip as well as to the legs, and thus avoid the stress produced by the line contact of the roll elements that form the bridge. This may be done in the manner shown schematically in FIG. 11 in which the head portion 35 is oblique to the strip and the leg-forming portions 36 and 37 extend angularly from the ends of the head portion or crown of the fastener. Alternatively the reverse arrangement shown in FIG. 13 of my Patent No. 2,651,232 may be employed, or the arrangement shown in FIG. 5. Actually the present invention may be used for making all of the fastener forms shown in the drawing of said patent, and others.

In FIG. 17 I have shown a connected series of fastener blanks and the manner of forming it in which the head portion is initially formed in line with the leg portion instead of being angularly disposed with respect thereto. In this figure 40 is a flat strip of metal, the edges of which have been notched, the edge 41 having head-forming notches and the edge 42 having triangular notches therein. The strip is rolled in the manner described between roll surfaces similar to 12a and 15a of FIGS. 14 and 15, so as to score the blank with diagonal score strips or narrow flattened severance areas 43, each strip being parallel and extending from the deepest portion of a notch in edge 41 to the deepest portion of a notch in edge 42, and the axis of the intervening blank 44 being diagonal to the length of the strip. The metal of each blank is shaped by the rolls to the same section as the leg elements of the fasteners previously described.

These fasteners are intended to be furnished to the user in strip form and the user will have a driver which in turn shears each blank in turn and drives it. The fastener may have heads of various shapes, the one shown in FIG. 18 being generally for use as a finishing nail. It has a shank 45 and a small widened head 46. Because of the concave-convex section of the shank and the cold working of the metal in the manner described, it will have good driving strength, a grain orientation that resists breaking, and good holding power, because of its shape, in the wood. It will adapt itself better and more economically to machine driving than present nails which are required to be placed on a tape for machine operation.

In the various forms of fasteners herein described, the shaping of the head-forming portions of the fastener is of importance in that without such forming, the head portion, being of initially soft metal, would easily bend or pull up from the surface against which it is driven, but by forming it similarly to the leg it has a strength and camber which hold it close against the surface against which it is driven.

In the making of the tack strip of FIG. 2, where the diagonal legs extend in only one direction from the head-forming elements, the rolls must be very accurately designed, if made as shown in FIG. 16, to avoid introducing a slight camber across the strip due to the fact that the rolling pattern is non-symmetrical about the longitudinal axis of the strip, whereas this condition is not encountered in forming the staple where the stresses are substantially equal on opposite sides of the longitudinal center line of the strip at all times. A second factor is that in forming any of the fasteners herein described, there is danger of making the connecting webs too thin or cutting through entirely.

To avoid the first difficulty, I roll the tack strip in double width and then slit the rolled strip longitudinally. To avoid the second difficulty I provide bearing disks at the sides of the forming rolls to limit the approach of the forming rolls to a predetermined minimum whereby the connecting webs of the strips are of uniform minimum thickness. These procedures are illustrated in FIGS. 19 and 20.

In FIG. 19 the strip 25 is double the width of the tack strip. It may be rolled with a parting line 26 down the longitudinal center of the strip, and at each side of the parting line there are a succession of head-forming elements 27 from which extend oblique leg-forming elements 28 that extend to the edge of the strip. I have here shown the oblique legs at one side extending in a direction opposite those on the other side of the center line, but it may be the same, as in FIG. 10. Thus the parting strip area between adjacent head-forming elements is equal on opposite sides of the center line, and a leg element is being rolled at each side of the center line at all times. There is therefore a balance of stresses on the rolls, and forces tending to camber the strip in one direction are opposed by those on the other. After the strip is formed, it is slit down the center, making two individual fastener strips. I prefer to extend the leg elements in opposite directions on the two sides of the strip so as to avoid making one strip of tacks having right-hand legs and the other left-hand. That is if the strip of FIG. 10 were divided down the center, a driver to accept one strip would not accept the other, whereas in FIG. 19 both resulting strips can be used in the same driver.

In FIG. 20, the two rolls are schematically illustrated at 30 and 31. They are carried on shafts 32 and 33 respectively and are provided with forming surfaces 34 and 35 respectively similar to those described. At 37 are indicated meshing gears for keeping the two rolls in register. There is shown alongside each roll a disk 38, and the peripheries of these disks are transversely flat so that the two disks roll on one another and limit the travel of one roll toward the other to a point where the ridges 12 and 12a (FIGS. 12 and 13) cannot contact the periphery of the opposite roll, so that the connecting strips between blanks will have a uniform minimum thickness. It will be understood that this expedient may be used on the rolls of FIG. 16, or in the rolling of any other forms of fasteners herein described.

While various changes and modifications may be made in the shape of the fastener, my invention provides a fastener and method of producing superior fastener blanks of improved construction at high rates of speed from strip metal of a type which can be purchased more cheaply than wire now commonly used. Each fastener blank may be readily severed progressively from the next. Empty spaces or concavities are provided between blanks for indexing and feeding, and the rolls may produce several thousand blanks per minute, even at relatively low roll speed. Moreover, instead of effecting the formation of the blank entirely in one pair of rolls, complementary successive pairs of rolls may be used.

I claim:
1. As a new article of manufacture, a connected strip of fastener blanks comprising an elongated ribbon of sheet metal, the strip being corrugated to provide parallel ridges and grooves with the ridges being of generally concavo-convex section of solid metal increasing in thickness from the edges toward the center of each ridge, the metal forming the bottom of the valleys between the ridges being of less width than the ridges and being thinner in section than the ridges, the ridges between the valleys constituting the fastener blanks and the thin metal areas of the bottoms of the valleys constituting severance lines, said ridges and valleys throughout the greater portion of their length being diagonal to the longitudinal axis of the strip, lesser portions of each ridge extending more nearly at right angles to the longitudinal axis of the strip than said first-named diagonal portions of each ridge.

2. A sheet metal fastener having a head portion and an integral leg portion, the leg portion being formed by simultaneously corrugating the metal to form ridges and cold-flowing the metal from the areas between the ridges into the leg portions, the leg portions being concavo-convex in section and of diminishing thickness from the center toward the edges, each leg having a flat fin-like ledge along each edge, the head portion being wider than the leg portion, the leg extending in a plane perpendicular to the head and being joined thereto by a diagonal connection in the plane of the head portion, the head portion being also concave on its under surface.

3. The method of converting a long narrow strip of sheet metal into a succession of fastener blanks disposed in a direction generally crosswise of the strip which comprises corrugating the strip to form ridges extending from the opposite edges of the strip toward the center and constituting leg elements of fastener blanks and crowding metal in the strip from the edges of each ridge into the center so that the section of metal through the ridge is thicker than the original strip, and displacing metal from the portions of the strip between the ridges in a direction crosswise of the ridges into the ridges and thereby forming between adjacent ridges flattened severance areas that are thinner in section than the original strip and which can be easily sheared to separate one blank from the next while strengthening and work-hardening the ridges, the ridges extending from the opposite edges of the strip joining wider corrugated head-forming portions formed along the middle of the strip with the leg-forming portions extending obliquely therefrom whereby the rolling pattern is symmetrical about the center line of the strip.

4. The method of converting a long narrow strip of sheet metal into a succession of fastener blanks disposed in a direction generally crosswise of the strip which comprises corrugating the strip to form ridges extending from the opposite edges of the strip toward the center and constituting leg elements of fastener blanks and crowding metal in the strip from the edges of each ridge into the center so that the section of metal through the ridge is thicker than the original strip, and displacing metal from the portions of the strip between the ridges in a direction crosswise of the ridges into the ridges and thereby forming between adjacent ridges flattened severance areas that are thinner in section than the original strip and which can be easily sheared to separate one blank from the next while strengthening and work-hardening the ridges, the ridges extending from the opposite edges of the strip joining wider corrugated head-forming portions formed along the middle of the strip with the leg forming portions extending obliquely therefrom whereby the rolling pattern is symmetrical about the center line of the strip, and thereafter dividing the strip along its longitudinal center line to provide two separate strips of connected fastener blanks.

References Cited in the file of this patent

UNITED STATES PATENTS

| | | |
|---|---|---|
| 239,737 | Dean | Apr. 5, 1881 |
| 1,465,783 | Polzer | Aug. 21, 1923 |
| 1,581,887 | Taplin | Apr. 20, 1926 |
| 2,021,274 | Vogel | Nov. 19, 1935 |
| 2,293,862 | Sorenson | Aug. 25, 1942 |
| 2,311,501 | Zoldok | Feb. 16, 1943 |
| 2,651,232 | Lang | Sept. 8, 1953 |

FOREIGN PATENTS

| | | |
|---|---|---|
| 716,780 | France | Oct. 12, 1931 |
| 716,781 | France | Oct. 12, 1931 |